(12) United States Patent
Roycroft et al.

(10) Patent No.: US 6,796,856 B2
(45) Date of Patent: Sep. 28, 2004

(54) STEERING SYSTEM (75) Inventors: Terence James Roycroft, Waiuku (NZ); Adam Paul Ruddle, Birmingham (GB)

(73) Assignee: Gibbs Technologies Limited (GB)

( * ) Notice: Subject to any disclaimer, the term of this patent is extended or adjusted under 35 U.S.C. 154(b) by 20 days.

(21) Appl. No.: 10/381,083

(22) PCT Filed: Sep. 28, 2001

(86) PCT No.: PCT/GB01/04354

§ 371 (c)(1),
(2), (4) Date: Mar. 19, 2003

(87) PCT Pub. No.: WO02/28695

PCT Pub. Date: Apr. 11, 2002

(65) Prior Publication Data

US 2004/0097146 A1 May 20, 2004

(30) Foreign Application Priority Data

Sep. 30, 2000 (GB) ............................................. 0023955
Sep. 30, 2000 (GB) ............................................. 0023956

(51) Int. Cl.[7] ............................................. B63H 19/08
(52) U.S. Cl. .................... 440/12.51; 440/61 S; 114/150
(58) Field of Search ............................ 114/144 R, 150; 440/12.5, 12.51, 12.53, 12.54, 12.56, 12.63, 12.66, 61 R, 61 S, 61 C; 280/773; 180/6.3, 417, 442; 74/480 B, 484 R (56) References Cited

U.S. PATENT DOCUMENTS 3,351,147 A * 11/1967 Williamson ................. 180/6.3
4,811,805 A 3/1989 Yoshida et al. ............. 180/140
4,856,814 A * 8/1989 Jones ........................ 280/86.5
4,966,246 A 10/1990 Janson et al. ............... 180/140
5,337,850 A 8/1994 Mouri et al. ................ 180/140
5,590,617 A 1/1997 Gere et al. .................. 114/270
5,727,494 A 3/1998 Caserta et al. .............. 114/270

FOREIGN PATENT DOCUMENTS

| DE | 3720273 A | * | 1/1989 | ............ B32D/5/06 |
| FR | 2411095 | | 7/1979 | |
| SU | 1310276 A | * | 5/1987 | ............ B62D/5/06 |
| WO | WO 9206881 A1 | * | 4/1992 | ............ B62D/7/14 |
| WO | WO 9629230 A1 | * | 9/1996 | ............ B62D/7/14 |

OTHER PUBLICATIONS

Copy of Search of Great Britain.

* cited by examiner

Primary Examiner—S. Joseph Morano
Assistant Examiner—Ajay Vasudeva
(74) Attorney, Agent, or Firm—Young & Basile, P.C.

(57) ABSTRACT

A steering system for amphibious vehicle includes a control connected to road steering means. Ram is conventionally used to assist road steering, but by disconnecting command valves, it becomes a hydraulic master cylinder, driving slave cylinder; and thus marine steering means. Valves and hydraulic reservoir enable the marine steering to be disconnected from road steering. The marine steering means may be center biased by springs. A sensor and control means may synchronize center positions of road and marine steering. The valve and port layout may also achieve this goal. Alternatively, power steering in road mode may be maintained by fitting a master cylinder in parallel or in series with steering means; and may have hydraulic, electro-hydraulic, electric, or magnetic assistance.

24 Claims, 4 Drawing Sheets

STEERING SYSTEM

This application is a 371 of International Application No. PCT/GB01/04354, filed Sep. 28, 2001.

The invention relates to a steering system for an amphibious vehicle and to an amphibious vehicle having such a steering system. The invention also relates to a method of modifying a conventional hydraulically power assisted steering rack for use in such a steering system for an amphibious vehicle.

It is already known to provide amphibious vehicles with steering systems capable of operation on land and water. Most simply, these systems are composed of two independent steering arrangements, for example, a steering wheel which is connected to a conventional rack and pinion arrangement for land operation, and a tiller, which is connected to the head of a rudder for water operation.

In more advanced steering systems, a steering wheel controls both land steeling and water steering. For example, in U.S. Pat. No. 5,727,494, an amphibious vehicle is disclosed having a steering wheel connected to a fixed gear box by means of a shaft. The fixed gear box is telescopically connected to a moving gear box, and steering rods connected to the moving gear box enable turning of the front wheels of the vehicle. The steering shaft is also connected to a mechanical cable steering system which controls turning of a rudder. The land and water steering arrangements are both permanently connected to the steering wheel. It is considered that a cable steering system is inflexible in its relation of force to distance, and susceptible to friction and to corrosion in a marine environment.

In accordance with a first aspect of the invention, there is provided a steering system for an amphibious vehicle comprising a steering control operatively connected to a road steering means for steering at least one wheel of the vehicle and a marine steering system, the marine steering system comprising a hydraulic master cylinder in fluid connection with a hydraulic slave cylinder, the slave cylinder being operatively connected to a marine steering means, characterised in that the master cylinder is operatively linked to the road steering means such that it drives the slave cylinder, and hence the marine steering means, in response to movement of the road steering means.

In a preferred embodiment, the master cylinder comprises a double acting piston defining first and second chambers on either side of the piston, the piston being connected to the road steering means for movement therewith, the hydraulic slave cylinder also comprising a double acting piston defining first and second chambers on either side of the piston, the piston of the slave cylinder being connected to the marine steering means for movement therewith, and the first chamber of the master cylinder being in fluid connection with the first chamber of the slave cylinder and the second chamber of the master cylinder being in fluid connection with the second chamber of the slave cylinder.

Preferably, the road steering means is a steering rack which forms part of a rack and pinion assembly. In this arrangement, the master cylinder may be formed as an integral part of the rack and pinion assembly. Part of the casing of the rack and pinion assembly may form a housing of the master cylinder, and the master cylinder piston may be attached to the steering rack for movement with the rack within the master cylinder housing. The master cylinder may be provided in-line with the steering rack. Alternatively, the master cylinder may be arranged substantially parallel to the steering rack, the master cylinder piston being attached to a piston rod which is connected to the rack by means of at least one link.

Preferably, means are provided to selectively activate or de-activate the marine steering system. The means for selectively activating or de-activating the marine steering system may comprise valve means for selectively connecting the chambers of the master cylinder and/or the slave cylinder with a hydraulic fluid reservoir. Alternatively, the means for selectively activating or de-activating the marine steering system may comprise valve means for selectively placing the first and second chambers of the master cylinder in fluid connection with each other.

Where means are provided to selectively activate or de-activate the marine steering system, means may also be provided for synchronising the straight ahead positions of the road steering means and the marine steering means while the marine steering system is activated.

Preferably, tie valve means is operable to activate the marine steering means only when the road steering means is in a straight ahead position or substantially so. A sensor may be provided to detect when the road steering means is in, or substantially in, a straight ahead position, and the steering system may further comprise control means which permits operation of the valve means to activate the marine steering system only when the sensor detects that the road steering means is in, or is substantially in, the straight ahead position. In a preferred arrangement, the sensor detects the position of the master cylinder piston in order to determine when the road steering means is in the straight ahead position.

In an alternative arrangement the master cylinder is connected to a hydraulic fluid reservoir via at least one port located at, or substantially at, a predetermined point in the stroke of the piston which equates with a straight ahead position of the road steering means, the arrangement being such that following actuation of the valve means to actuate the marine steering means, movement of the slave cylinder piston in a given direction will only occur once the piston has passed the central point in its stroke to close a respective chamber from the reservoir. Preferably, the master cylinder is connected to the reservoir via two ports arranged one on either side of the central point of the stroke of the master cylinder piston. The two ports may be spaced by a distance which is slightly larger than the thickness of the master cylinder piston.

Preferably, the steering system further comprises resilient means for biasing the marine steering means towards a straight ahead position. The resilient means may comprise a pair of springs, a first of the springs being located in a first chamber of the slave cylinder and a second of the springs being located in a second chamber of the slave cylinder, the arrangement being such that the first and second springs act on opposite sides of the slave cylinder piston in order to bias the piston towards a predetermined point in its stroke which equates to a straight ahead position of the marine steering means.

Preferably, the road steering means is power assisted. The power assistance may comprise a hydraulic power assistance system. Alternatively, the power assistance may comprise an electric, electro-hydraulic, or magnetic power assistance system. It is particularly advantageous if the road steering system uses hydraulic fluid, as its fluid reservoir can also be used for the marine steering system.

In accordance with a second aspect of the invention, there is provided an amphibious vehicle, characterised in that the vehicle comprises a steering system in accordance with the first aspect of the invention.

In accordance with a third aspect of the invention, there is provided a method of adapting a conventional hydraulically power assisted steering rack for use in a steering system in accordance with the first aspect of the invention, the method comprising:

providing a steering rack having a double acting hydraulic ram defining first and second ram chambers and a control valve;

disconnecting the first and second ram chambers from the control valve;

providing a slave cylinder for actuation of a marine steering means, the slave cylinder having a piston defining first and second chambers on either side of the piston; and fluidly connecting the first ram chamber of the steering rack with a first chamber of the slave cylinder and fluidly connecting the second ram chamber of the steering rack with a second chamber of the slave cylinder.

Several embodiments of the invention will now be described, by way of example only, with reference to the accompanying drawings in which.

Figure 1:
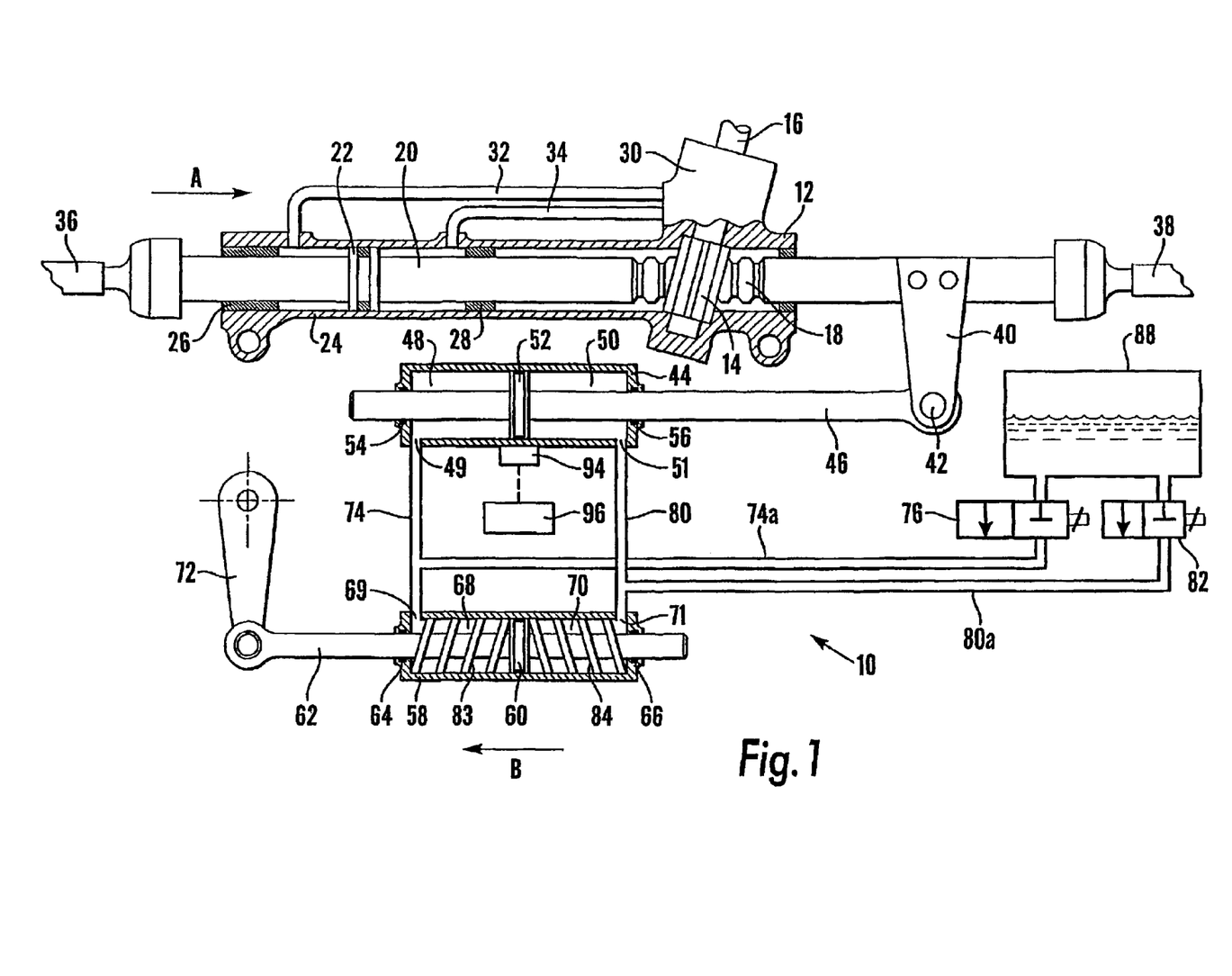
FIG. 1 is a part sectional, part schematic view of a first embodiment of a steering system in accordance with the invention.

Referring firstly to FIG. 1, a first embodiment of a steering system in accordance with the invention for use in an amphibious vehicle is indicated generally at 10. A conventional power assisted steering rack and pinion assembly 12 for a road vehicle is adapted for use in the system and includes a pinion 14 mounted on a steering column 16 and a geared rack 18 which is in meshing engagement with the pinion 14. A steering control, for example a steering wheel (not shown) is attached to the steering column 16.

The left hand (as viewed) end of the rack 18 is formed as a double acting ram 20, to provide power assistance to the movement of the rack 18 in a conventional manner. To this end, a piston 22 is mounted on the rack 18 which is sealed in a hydraulic cylinder 24 by seals 26, 28. Command valving, indicated generally at 30, is mounted around the steering column 16 and hydraulic lines 32, 34 are provided to connect the valving with chambers formed on either side of the piston 22 in the cylinder 24. The left hand end of the rack 18 (as viewed) is connected to a steering arm 36 and the right hand end (as viewed) of the rack 18 is connected to a steering arm 38. The steering arms 36,38 extend to turn the front wheels (not shown) of the vehicle.

A link member 40 is attached to the right hand side (as viewed) of the rack 18, between the gear teeth and the connection to the steering arm 38. The member 40 extends perpendicularly from the rack 18 and is provided with a pivotal mounting 42 at its end. A master hydraulic cylinder 44 having a piston rod 46 is positioned to one side of, and parallel with, the rack 18 of the steering rack 12. An end of the piston rod 46 is pivotally attached to the link member 40 by means of the mounting 42.

The master cylinder 44 has first and second chambers 48, 50 on either side of a double acting piston 52, which is mounted on the piston rod 46. The piston rod 46 extends from both ends of the cylinder 44 and is sealed to the cylinder by seals 54, 56. First and second ports 49, 51 are provided at either end of the cylinder 44 in fluid connection with the respective chambers 48, 50.

A slave hydraulic cylinder 58 is mounted at the rear of the vehicle (not shown). The slave cylinder 58 comprises a double acting piston 60 mounted on a piston rod 62, first and second chambers 68, 70 on either side of the piston 60, and seals 64, 66 which seal the piston rod 62 to the ends of the cylinder 58. First and second ports 69, 71 are provided at either end of the cylinder 58 in fluid connection with the respective first and second chambers 68, 70. An end of the piston rod 62 is pivotally attached to a steering arm 72 of a marine steering means, for example a rudder or water jet nozzle (not shown).

A hydraulic line 74 extends from the port 49 of the first chamber 48 of the master cylinder 44 to the port 69 of the first chamber 68 of the slave cylinder 58. Similarly, a further hydraulic line 80 connects the port 51 of the second chamber 50 of the master cylinder with the port 71 in the second chamber 70 of the slave cylinder 58. A branch line 74a extends from the hydraulic line 74 to fluidly connect the respective first chambers 48, 68 of the master and slave cylinders with a hydraulic fluid reservoir 88 via a first valve 76. Likewise a second branch line 80a extends from the hydraulic line 80 to fluidly connect the respective second chambers 50, 70 of the master and slave cylinders with the fluid reservoir 88 via a second valve 82.

The valves 76, 82 are shown in FIG. 1 in a "closed" position which prevents hydraulic fluid from entering the reservoir 88 from the branch lines 74a, 80a. The valves can be moved, by any suitable means, to an open position in which hydraulic fluid can flow freely between the branch lines 74a, 80a and the reservoir.

Springs 83, 84 are located in the first 68 and second 70 chambers respectively of the slave cylinder and react against their respective ends of the cylinder and the piston 60 in order to urge the piston toward a central position within the cylinder. The central position of the piston corresponding to a straight ahead position of the marine steering means.

Operation of the steering system 10 with the valves 76, 82 closed will now be described.

When an operator wishes to turn the vehicle, he causes the steering column 16 and pinion 14 to rotate by the use of the steering wheel. This causes movement of the rack 18, hydraulically assisted by the piston 22 in conventional manner, and the steering arms 36, 38 are moved accordingly to turn the front wheels (not shown) of the vehicle.

Movement of the geared rack 18, for example, in the direction of arrow A, causes movement of the link member 40 and hence the piston rod 46 and piston 52 of the master cylinder 44 in the same direction. The chamber 50 therefore decreases in volume and hydraulic oil is forced through the port 51 and hydraulic line 80, into the chamber 70 of the slave cylinder 58. The piston 60 and piston rod 62 of the slave cylinder 58 are forced, against the action of spring 83, in the opposite direction to the piston 52 and piston rod 46 of the master cylinder 44, that is in the direction of arrow B, with the effect of moving the steering arm 72 of the marine propulsion means. At the same time, hydraulic oil in the chamber 68 of the slave cylinder flows through the line 74 into the chamber 48 of the master cylinder 44 which increases in volume.

If the geared rack 18 is moved in the opposite direction, that is in the direction of arrow B, the pistons 52, 60 move in opposite directions, the hydraulic oil flows in the other direction through the lines 74 and 80 and the steering arm 72 is moved in the direction of arrow A.

Thus the steering system 10 provides for simultaneous or dual operation of both a land steering system and a marine steering system from a single steering control, in this case a steering wheel. This enables an operator to steer the vehicle either on land or on water from the same steering control.

In the above described operation of the steering system, the valves 76, 82 are closed, as shown in FIG. 1, so preventing hydraulic fluid from flowing from the hydraulic lines 74, 80 into the hydraulic reservoir 88. However, if it is desired to steer the wheels of the vehicle (not shown) but not to move the steering arm 72 of the marine propulsion means, the hydraulic valves 76, 82 can be opened to place the hydraulic lines 74, 80 interconnecting the first 48, 68 and second 50, 70 chambers of the master and slave cylinders in fluid connection with the reservoir 88.

With the valves 76, 82 open, movement of the piston 52 of the master cylinder in the direction of arrow A will cause hydraulic fluid to flow into line 80 as before. However, because spring 83 resists movement of the slave cylinder piston 60 in the direction of arrow B, the fluid will tend to flow into the branch line 80a and into the reservoir, as this is the course of least resistance. At the same time hydraulic fluid will be drawn from the reservoir into branch line 74a, through line 74, and into the chamber 48 of the master cylinder. Consequently, the piston 60 and piston rod 62 of the slave cylinder 58 do not move and so the marine steering means is not actuated.

Similarly, if the master cylinder piston 52 is moved in the opposite direction, hydraulic fluid will flow from the chamber 48 of the master cylinder into the line 74, along the branch line 74a and into the reservoir 88. At the same time, fluid will be drawn from the reservoir into chamber 50 of the master cylinder via branch line 80a and line 80. This time, however, it is the spring 84 which resists movement of the slave cylinder piston 60.

Thus with the valves 76, 82 open, the marine steering system is effectively disabled or deactivated so that the vehicle can be steered on land without a corresponding movement of the marine steering means.

Whilst springs 83, 84 for urging the marine steering means to a straight ahead position are shown internally of the slave cylinder, this need not be the case and the springs could be provided externally of the cylinder, for example springs could be provided for co-operation with the piston rod 62. Indeed such spring means need not act directly on the slave cylinder at all but could be arranged to act on any part of the marine steering system provided that it tends to urge the marine steering means to a straight ahead position.

Figure 2:
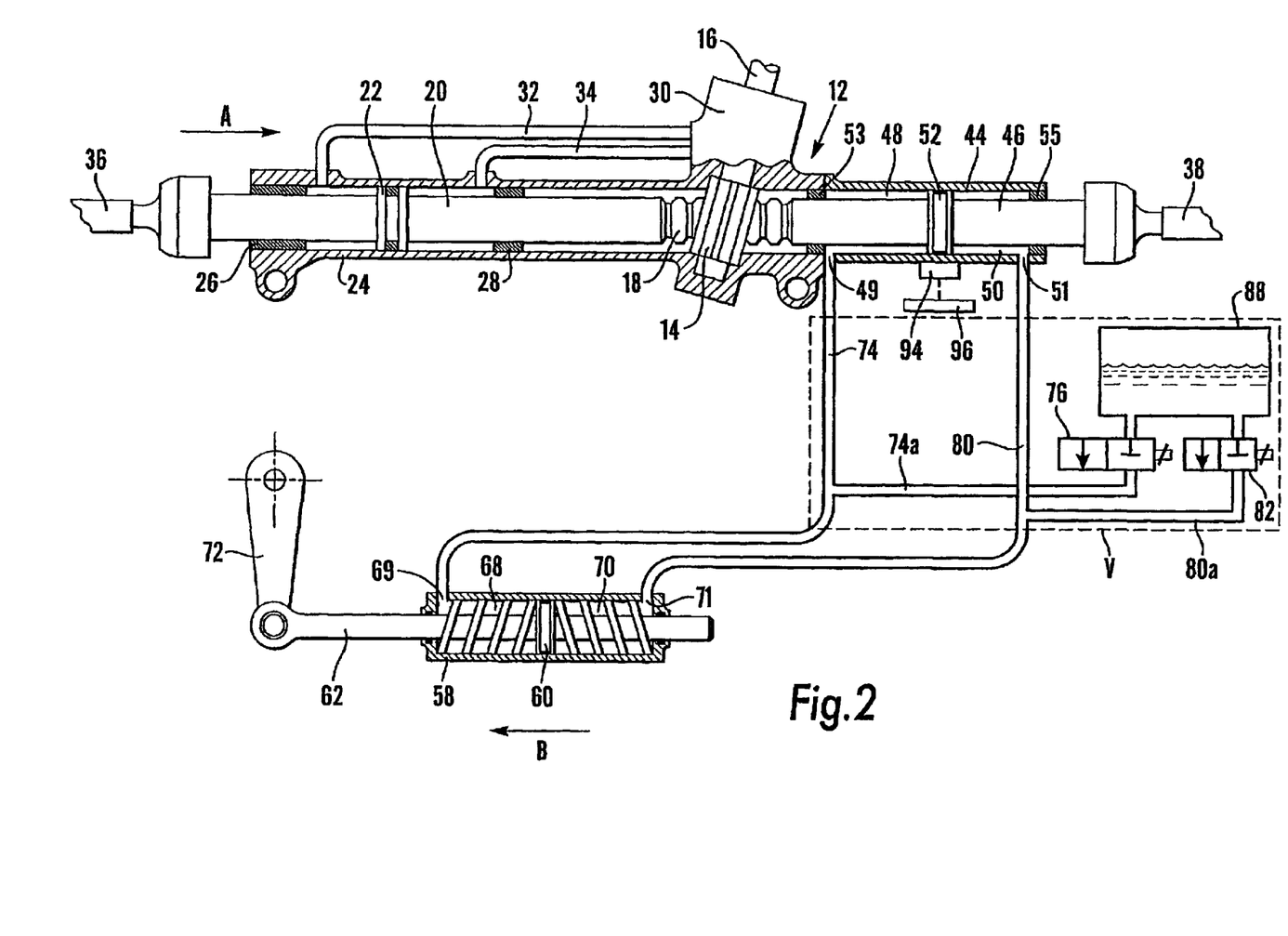
FIG. 2 is a part sectional, part schematic view of a second embodiment of a steering system in accordance with the invention.

In an alternative embodiment shown in FIG. 2, the right-hand end (as viewed) of the steering rack and pinon assembly 12 is modified to provide an integrated master cylinder which is co-axial with the assembly 12. Common reference numerals have been used to designate parts in common with parts in FIG. 1.

The casing of the conventional power assisted steering rack 12 is extended to form a housing of the master cylinder 44. The right-hand end (as viewed) of the geared rack 18 is formed as the piston rod 46, which is connected to a steering arm 38. A double acting piston 52 is mounted on the piston rod 46, and first and second chambers 48, 50 are formed on either side of the piston 52. Seals 53,55 seal between the piston rod 46 and the cylinder 44. Ports 49, 51 which communicate with the respective chambers 48, 50 are connected to hydraulic lines 74, 80 respectively and the remaining hydraulic circuit is identical to that of the embodiment described above in relation to FIG. 1.

The operation of the FIG. 2 embodiment is the same as that of the FIG. 1 embodiment, save that when the geared rack 18 moves, the piston rod 46 and piston 52 of the master cylinder 44 are moved directly, rather than through the linking member 40 of FIG. 1.

In a third embodiment of the invention (not shown), the steering rack 12 of the first embodiment is replaced by a conventional steering box, which includes a gear reduction from the steering column 16. The output of the steering box which connects to the steering arms 36, 38, is also connected to a link member 40, in exactly the same manner as the connection to the steering rack 12 in FIG. 1. The operation of this embodiment is the same as that of the FIG. 1 embodiment.

In other alternative arrangements, the steering box or rack can be replaced with any other known steering means. In all of the embodiments, the valves 76, 82 can be controlled electrically, manually or by a hydraulic control circuit.

Figure 3:
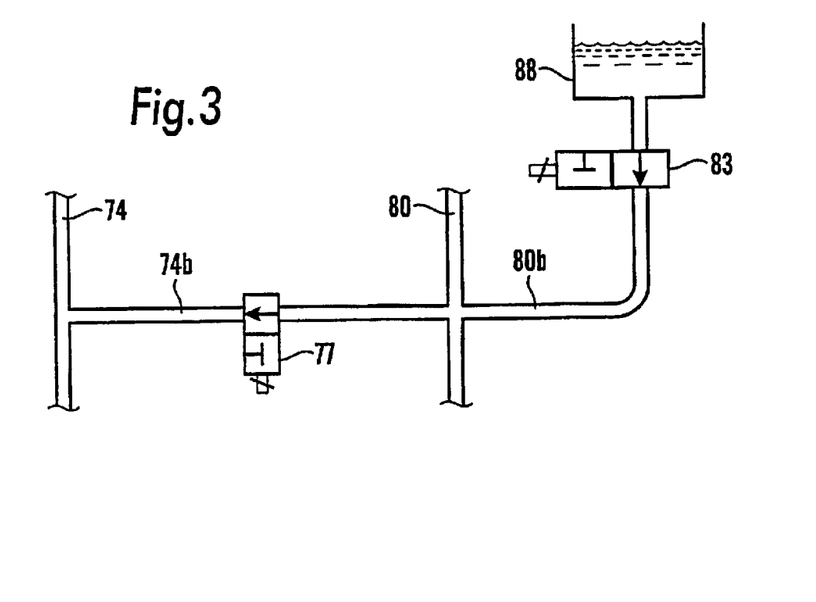
FIG. 3 shows an alternative arrangement of hydraulic valves for use with the steering systems of FIGS. 1 and 2.

The dashed line box V in FIG. 2, encapsulates the valve and reservoir system used to activate or de-activate the marine steering system. An alternative system, which could be used with either of the FIG. 1 or FIG. 2 embodiments, is shown in FIG. 3. In this alternative arrangement, a cross line 74b is provided to link lines 74 and 80 and an on-off valve 77 is located in the line. When the on-off valve 77 is opened, as shown in FIG. 3, hydraulic fluid can pass directly between the lines 80 and 74, thus de-activating the marine steering system. When the valve 77 is closed the marine steering system is activated and will operate as described above in relation to FIGS. 1 and 2 when the valves 76 and 82 are closed. If required, a further hydraulic line 80b can be provided to connect the hydraulic circuit to a fluid reservoir 88. A further on-off valve 83 is provided in the line 80b which can be opened whilst the valve 77 is opened to replenish any loss of hydraulic fluid in the circuit whilst the marine steering system is de-activated.

Figure 4:
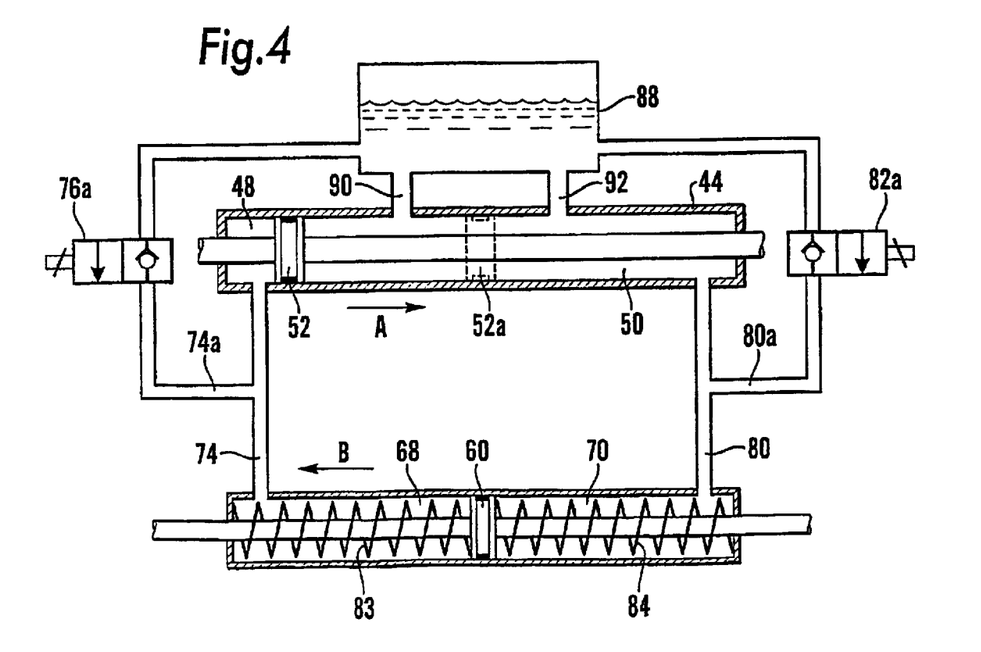
FIG. 4 is a sectional view of part of a modified master cylinder for use in the steering systems of FIGS. 1 and 2.

When activating or deactivating the hydraulic marine steering system, it is desirable that the straight ahead positions for the steering rack 18 and the marine steering means should be synchronised. FIG. 4 shows schematically, a modification to the master cylinder 44 of either of the embodiments described above in relation to FIGS. 1 and 2. In the modified master cylinder, two additional ports 90, 92 are provided one on either side of a central point 52a in the stroke of the piston 52. The central point 52a in the stroke of the master cylinder piston 52 corresponding to the straight ahead position of the steering rack. The additional ports 90, 92 fluidly connect the chambers 48, 50 of the master cylinder with the hydraulic fluid reservoir 88.

In this arrangement, the valves 76a, 82a can be closed to prevent hydraulic fluid flowing from the hydraulic lines 74, 80 into the reservoir 88 at any time. However, movement of the slave cylinder piston 60 will only occur when the master cylinder piston 52 passes the central point and isolates a respective chamber 48, 50 from the reservoir 88 by closing off a respective one of the ports 90, 92.

For example, if the piston is moved from the central position 52a in the direction of arrow A, it will pass the port 92 to create a closed volume in the chamber 50 and the hydraulic line 80. Further movement of the piston in the same direction will displace fluid from the chamber 50 to the corresponding chamber 70 of the slave cylinder and so move the slave cylinder piston 60 in the direction of arrow B moving the marine steering means. At the same time fluid displaced from the chamber 68 of the slave cylinder flows along the line 74 into the chamber 48 of the master cylinder. When the steering rack and master cylinder piston 52 are moved back in the opposite direction, the spring 83 ensures that the slave cylinder piston 60 follows the movement of the master cylinder piston 52. Similarly, movement of the master cylinder piston in the opposite direction to arrow A from the central position 52a will close the port 90 and so create a closed volume in the chamber 48 and the system will be reversed.

In the above arrangement, whenever the master cylinder piston passes the central position, both chambers 68, 70 of the slave cylinder are fluidly connected to the reservoir 88 (via the hydraulic lines 74, 80, first and second chambers 48, 50 of the master cylinder, and the ports 90, 92) such that the springs 83, 84 are operative to centre the slave cylinder piston 60 to return the marine steering means to the straight ahead position. This ensures that the straight ahead positions of the steering rack and the marine steering means remain synchronised.

The valves 76a, 82a feature check or non-return valves in the "closed" position which work in combination with the ports 90, 92 between the master cylinder and the reservoir, and the springs 83, 84 in the slave cylinder 48 to prevent unwanted movement of the slave cylinder piston 60 in the event that the valves 76a, 82a are closed when the master cylinder piston 52 is positioned away from the central position 52a.

Operation of the non-return valves can be explained as follows. If the valves 76a, 82a are closed whilst the master cylinder piston 52 is in the position shown in solid lines in FIG. 4, the open ports 90 and 92 will prevent displacement of fluid through hydraulic line 80 as the piston 52 moves towards the central position 52a in direction A. Such movement of the piston 52 could, however, lead to the generation of a vacuum, commonly known as cavitation, on the left side (as viewed) of the piston 52. If non-return valves are not used in the valves 76a, 82a, the generation of a vacuum on the left side of the master cylinder piston could draw the slave cylinder piston 60 in the direction of arrow B, due to negative pressure in chamber 68, even though there is no positive displacement of fluid into chamber 70. Although such movement would be corrected by fluid drawn in through port 90 once the piston passed the port 90, the transient marine steering effect created until this point is reached could be disturbing to the vehicle operator. This effect is prevented by the use of non-return valves as shown. Thus, if as described above, a negative pressure is developed behind the master cylinder piston 52 as it moves in the direction of arrow A, movement of the slave cylinder piston 60 in the direction of arrow B will be resisted by the spring 83 and fluid will be drawn from the reservoir 88 through non-return valve means in valve 76a, preventing any unwanted movement of the slave cylinder piston 60.

In the above arrangement, there will be a small dead area in which the slave cylinder will not be actuated as the master cylinder piston 52 moves between the two ports 90, 92 at the central point. Thus the spacing between the two ports should be kept to a minimum whilst ensuring that both chambers 48, 50 of the master cylinder are simultaneously connected to the reservoir when the piston is at the central point in its stroke. Rather than using two spaced ports 90, 92 as shown, a single port could be provided, with the port being larger than the thickness of the piston to ensure that both chambers 48, 50 of the master cylinder are simultaneously connected to the reservoir when the piston is at the central point 52a in its stroke In an alternative arrangement for ensuring that the straight ahead positions of the steering rack and the marine steering means are synchronised, the control means which actuates the valves 76, 82 is adapted such that the valves can only be switched when the steering rack is in the straight ahead position. For example, a sensor could be provided to detect when the rack is in the straight ahead position and the control means would be operative to allow actuation of the valves 76, 82 only when the sensor indicated that the rack was in the straight ahead position. In one embodiment, a sensor, indicated at 94 in FIG. 1, could be provided to sense when the piston 52 of the master cylinder was at the central point in its stroke, which corresponds to a straight ahead position of the rack. The sensor is connected to a control means, indicated schematically at 96, which controls the valves 76, 82 and which permits operation of the valves only when the sensor provides a signal indicating that the piston is at the central point. Since the marine steering means will be re-centred by the springs 83, 84 every time the valves 76, 82 are opened to de-activate the marine steering system, this arrangement will ensure that the straight ahead positions of the steering rack and the marine steering means remain synchronised.

Figure 5:
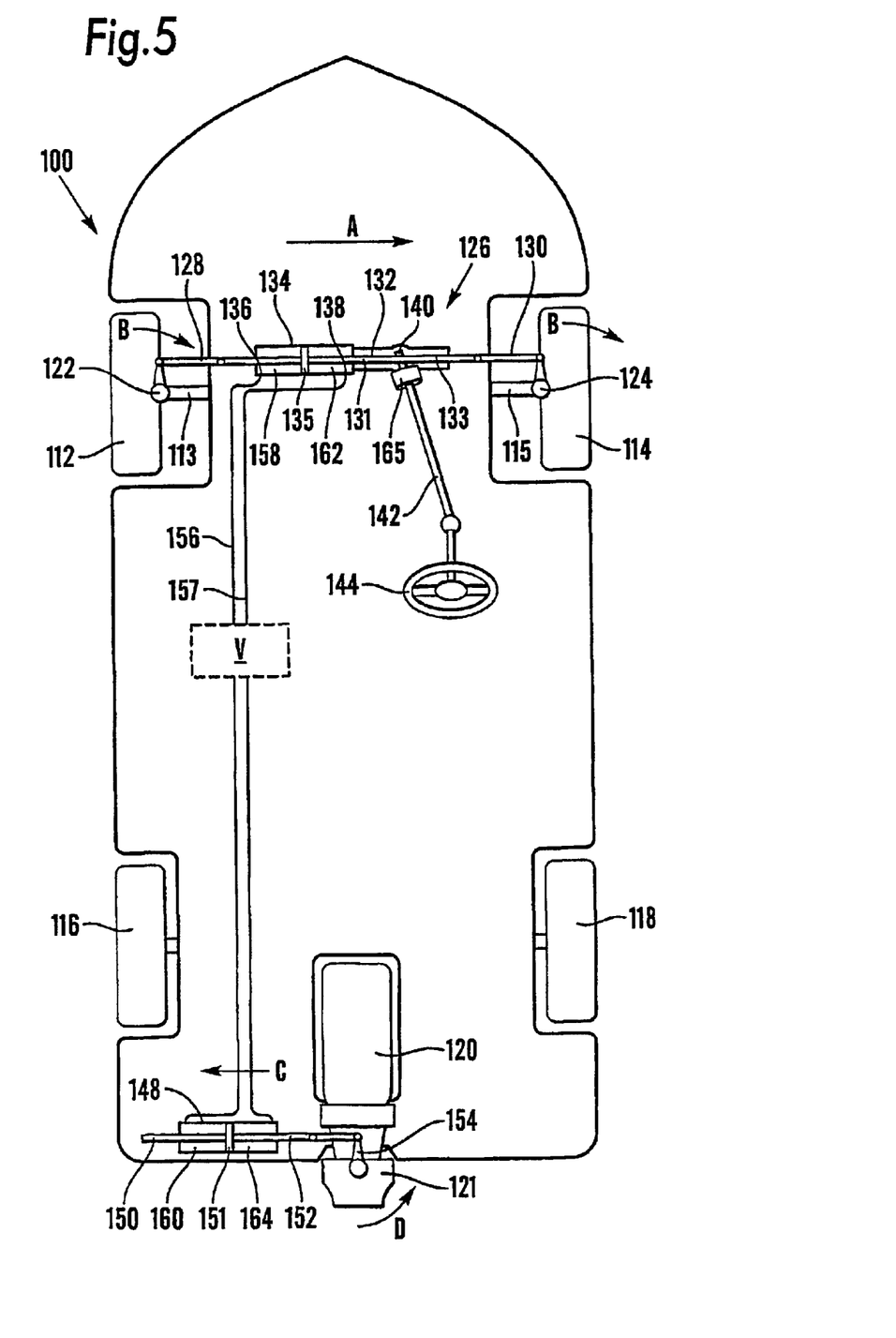
FIG. 5 is a schematic, partially sectioned plan view of an amphibious vehicle, showing a further embodiment of a steering system in accordance with the invention.

A further embodiment of a steering system in accordance with the invention is shown in FIG. 5. This embodiment again uses a power assisted steering rack as the road steering means, however, rather than providing an additional master cylinder for the marine steering system, the hydraulic ram of the power assisted steering rack is modified and utilised as the master cylinder.

FIG. 5 shows an amphibious vehicle capable of powered travel in land and marine modes which is generally indicated at 100. The vehicle 100 includes a pair of steerable front wheels 112, 114, a pair of rear wheels 116, 118 and a water jet unit 120 with a movable nozzle 121. The front wheels 112, 114 are supported in conventional manner by suspension members (not shown) mounted on wheel support uprights 122, 124 and are driven by drive shafts 113, 115 respectively. Steering links 128, 130 connect opposite ends of a steering rack and pinion assembly 126 to the wheel support uprights 122, 124 respectively.

The steering rack and pinion assembly 126 has a rack 132 in meshing engagement with a pinion 140 mounted at the end of a steering column 142. A steering wheel 144 mounted at the other end of the steering column 142 enables a driver to steer the vehicle in either land or marine mode as explained further below.

The steering rack and pinion set 126 includes a rack 132 and hydraulic cylinder or ram 134. The cylinder 134 comprises a double acting piston 135 mounted on the steering rack 132 within the cylinder to form two chambers 158, 162 on either side of the piston. The left hand end (as viewed) of the rack 132 is connected to the steering link 128, and the other end 133 of the rack 132 is connected to the steering link 130.

The cylinder or ram 134 is conventionally used to provide power assistance to the movement of the rack 132, however, in this arrangement, the cylinder is modified to function as the master cylinder of a hydraulic marine steering system. The modification includes disconnecting the chambers 158, 162 of the cylinder 134 from command valves 165 for the power steering, which are typically mounted on the steering column 142, and which conventionally direct pressurised hydraulic oil via ports 136, 138 into either one of the chambers 158, 162 to assist movement of the rack 132 and the front wheels 112, 114.

A further hydraulic cylinder 148, or slave cylinder is mounted at the rear of the vehicle adjacent the marine jet drive unit 120. The slave cylinder 148 also has a dual acting piston 151 with piston rods 150, 152 which extend from opposite ends of the cylinder. The piston rod 152 is pivotally connected to a steering arm 154 extending from the nozzle 121 of the jet unit 120, and the piston rod 150 is free.

The first chamber 158 of the master cylinder 134 is connected to a first chamber 160 of the slave cylinder 148 by a first hydraulic line 156, and the second chamber 162 of master cylinder 134 is connected to a second chamber 164 of the slave cylinder 148 by a second hydraulic line 157. The hydraulic circuit is filled with hydraulic oil, or any other suitable fluid. The hydraulic lines 156, 157 may be connected to their respective chambers 158, 162 via the ports 136, 138 used conventionally to connect the chambers to the power assistance command valving. Alternatively, further ports may be provided to enable the hydraulic lines to be connected with the chambers, in which case the ports 136, 138 will have to be sealed.

In operation, a driver rotates the steering wheel 144 in a chosen direction, for example clockwise. This causes the pinion 140 to drive the rack 132 to the right, as indicated by arrow A. Movement of the rack 132 causes the piston 135 and the steering links 128,130 to also move to the right, with the effect of turning the wheels 112, 114 to the right as indicated by arrows B.

The action of the piston 135 in the cylinder 134 causes an increase of volume in the left hand chamber 158 of the master cylinder 134 and an equal reduction in volume in the right hand chamber 162 of the master cylinder. Therefore, oil is forced from the chamber 162 along line 157 and into the right hand chamber 164 of the slave cylinder 148. This causes the piston 151 of the slave cylinder 148 to move to the left as indicated by arrow C. Furthermore, the piston rods 150,152 move to the left and consequently the nozzle 121 is caused to pivot in a direction indicated by arrow D. Hydraulic oil displaced from the chamber 160 of the slave cylinder 148 flows along line 156 into the chamber 158 of the master cylinder 134, thereby balancing the hydraulic flows.

Rotation of the steering wheel 144 in the anti clockwise direction causes movement of the parts in the opposite direction to that described for clockwise rotation of the steering wheel, and the hydraulic oil necessarily flows in the opposite directions in lines 156 and 157.

In the arrangement described, the hydraulic steering mechanism is permanently activated such that the marine steering system will be operated at all times even when the vehicle is being used on land. This provides a safe arrangement, in which it should not be possible for a driver to experience loss of steering in the road mode or marine mode. However, the hydraulic lines 156, 157 could be connected with a hydraulic reservoir via valves in a manner similar that described above in relation to FIGS. 1 to 4, so that the marine steering system can be selectively de-activated when not required. This is indicated schematically in FIG. 5 by dashed box V, where the valve and reservoir layouts V in FIG. 2 or 3 may be incorporated.

The use of a conventional power assisted steering rack in this way provides a low cost and compact arrangement for providing a master hydraulic cylinder for a marine steering system, at the expense of losing power assistance for the road steering means. However, in most amphibious vehicles, the engine and transmission are mounted towards the rear of the vehicle which means that the front end is necessarily light. As a consequence, power assisted steering is not essential and can be forgone without seriously detracting from the overall performance of the vehicle.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, the hydraulic circuits described are only preferred embodiments and those skilled in the art will be able to devise alternative or equivalent circuits which achieve the same objectives and functionality. Furthermore, whilst it is preferred that the marine steering systems described with reference to FIGS. 1 and 2 should be capable of being selectively de-activated, this is not essential and the circuits could be modified such that the marine steering system is permanently activated. It should also be understood that alternative means for selectively de-activating the marine steering means could be used. For example, rather than using hydraulic means for de-activating the marine steeling means, decoupler means could be employed between the slave cylinder and the marine steering means such that movement of the slave cylinder can be de-coupled from the marine steering means to de-activate the marine steering means. Theoretically, reservoir 88 could be omitted from any of the layouts described; however, a fluid reservoir is a convenient aid to system bleeding during vehicle manufacture or maintenance.

What is claimed is:

1. A steering system for an amphibious vehicle comprising a steering control operatively connected to a road steering means for steering at least one wheel of the vehicle and a marine steering system, the marine steering system comprising a hydraulic master cylinder in fluid connection with a hydraulic slave cylinder, the slave cylinder being operatively connected to a marine steering means, characterised in that the master cylinder is operatively linked to the road steering means such that it drives the slave cylinder, and hence the marine steering means, in response to movement of the road steering means.

2. A steering system as claimed in claim 1, in which the master cylinder comprises a double acting piston defining first and second chambers on either side of the piston, the piston being connected to the road steering means for movement therewith, the hydraulic slave cylinder also comprising a double acting piston defining first and second chambers on either side of the piston, the piston of the slave cylinder being connected to the marine steering means for movement therewith, the first chamber of the master cylinder being in fluid connection with the first chamber of the slave cylinder and the second chamber of the master cylinder being in fluid connection with the second chamber of the slave cylinder.

3. A steering system as claimed in claim 2, in which means are provided to selectively activate or de-activate the marine steering system.

4. A steering system as claimed in claim 3, in which the means for selectively activating or de-activating the marine steering system comprises valve means for selectively connecting the chambers of the master cylinder and/or slave cylinder with a hydraulic fluid reservoir.

5. A steering system as claimed in claim 3, in which the means for selectively activating or de-activating the marine steering system comprises valve means for selectively placing the first and second chambers of the master cylinder in fluid connection with each other.

6. A steering system as claimed in claim 5, in which means are provided for synchronising the straight ahead positions of the road steering means and the marine steering means while the marine steering system is activated.

7. A steering system as claimed in claim 6 wherein dependant on claim 5, in which the valve means is operable to selectively activate the marine steering means only when the road steering means is in a straight ahead position or substantially so.

8. A steering system as claimed in claim 7, in which a sensor is provided to detect when the road steering means is in, or substantially in, a straight ahead position, the steering system further comprising control means which permits operation of the valve means to activate the marine steering system only when the sensor detects that the road steering means is in, or is substantially in, the straight ahead position.

9. A steering system as claimed in claim 8, in which the sensor detects the position of the master cylinder piston in order to determine when the road steering means is in the straight ahead position.

10. A steering system as claimed in claim 6, in which the master cylinder is connected to a hydraulic fluid reservoir via at least one port located at, or substantially at, a predetermined point in the stroke of the piston which equates to a straight ahead position of the road steering means, the arrangement being such that following actuation of the valve means to activate the marine steering means, movement of the slave cylinder piston in a given direction will only occur once the piston has passed the predetermined point in its stroke, to close a respective chamber of the master cylinder from the reservoir.

11. A steering system as claimed in claim 10, in which the master cylinder is connected to the reservoir via two ports arranged one on either side of the predetermined point in the stroke of the master cylinder piston.

12. A steering system as claimed in claim 11, in which the two ports are spaced by a distance which is slightly larger than the thickness of the master cylinder piston.

13. A steering system as claimed in claim 1, in which the road steering means is a steering rack which forms part of a rack and pinion assembly.

14. A steering system as claimed in claim 13, in which the master cylinder is formed as an integral part of the rack and pinion assembly.

15. A steering system as claimed in claim 14, in which part of the casing of the rack and pinion assembly forms a housing of the master cylinder, and the master cylinder piston is attached to the steering rack for movement with the rack within the master cylinder housing.

16. A steering system as claimed in claim 13, in which the master cylinder is provided in-line with the steering rack.

17. A steering system as claimed in claim 13, in which the master cylinder is arranged substantially parallel to the steering rack, the master cylinder piston being attached to a piston rod which is connected to the rack by means of at least one link.

18. A steering system as claimed in claim 1, further comprising resilient means for biasing the marine steering means towards a straight ahead position.

19. A steering system as claimed in claim 18, in which the resilient means comprises a pair of springs, a first of the springs being located in a first chamber of the slave cylinder and a second of the springs being located in a second chamber of the slave cylinder, the arrangement being such that the first and second springs act on opposite sides of the slave cylinder piston in order to bias the piston towards a predetermined point in its stroke which equates to a straight ahead position of the marine steering means.

20. A steering system as claimed in claim 1 in which the road steering means is power assisted.

21. A steering system as claimed in claim 20, in which the power assistance comprises a hydraulic or electro-hydraulic power assistance system.

22. A steering system as claimed in claim 20, in which the power assistance comprises an electric or magnetic power assistance system.

23. An amphibious vehicle, characterised in that the vehicle comprises a steering system as claimed in claim 1.

24. A method of adapting a conventional hydraulically power assisted steering rack for use in a steering system as claimed in claim 1, the method comprising:

providing a steering rack having a double acting hydraulic ram defining first and second ram chambers and a control valve;

disconnecting the first and second ram chambers from the control valve;

providing a slave cylinder for actuation of a marine steering means, the slave cylinder having a piston defining first and second chambers on either side of the piston; and fluidly connecting the first ram chamber of the steering rack with a first chamber of the slave cylinder and fluidly connecting the second ram chamber of the steering rack with a second chamber of the slave cylinder.

* * * * *